(12) United States Patent
Oh et al.

(10) Patent No.: US 10,787,071 B2
(45) Date of Patent: Sep. 29, 2020

(54) LOCKUP CLUTCH FOR POWERSPLIT HYBRID TRANSMISSION

(71) Applicant: Ford Global Technologies, LLC, Dearborn, MI (US)

(72) Inventors: David Gon Oh, Ann Arbor, MI (US); Gregory Daniel Goleski, Rochester Hills, MI (US); David Allen Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 91 days.

(21) Appl. No.: 15/712,702

(22) Filed: Sep. 22, 2017

(65) Prior Publication Data

US 2019/0092156 A1 Mar. 28, 2019

(51) Int. Cl.
| *B60K 6/365* | (2007.10) |
| *F16H 3/72* | (2006.01) |
| *B60K 6/547* | (2007.10) |

(52) U.S. Cl.
CPC ............ *B60K 6/365* (2013.01); *F16H 3/728* (2013.01); *B60K 6/547* (2013.01); *B60Y 2400/73* (2013.01); *F16H 2200/0043* (2013.01); *F16H 2200/0047* (2013.01); *F16H 2200/201* (2013.01); *F16H 2200/2048* (2013.01)

(58) Field of Classification Search
CPC .......... F16H 3/728; F16H 3/727; F16H 3/724; F16H 3/72; F16H 2200/20; B60Y 2400/73; B60K 6/365; B60K 6/547
See application file for complete search history.

(56) References Cited

U.S. PATENT DOCUMENTS

| 7,223,200 | B2 | 5/2007 | Kojima et al. |
| 7,255,186 | B2 | 7/2007 | Wakuta et al. |
| 7,470,209 | B2 * | 12/2008 | Holmes .................. B60K 6/445 |
| | | | 477/3 |
| 7,632,201 | B2 | 12/2009 | Takami et al. |
| 7,727,112 | B2 * | 6/2010 | Kakinami ................ B60K 6/40 |
| | | | 477/79 |
| 8,535,201 | B2 | 9/2013 | Kuang et al. |
| 8,734,287 | B2 | 5/2014 | Kim et al. |
| 9,108,501 | B2 | 8/2015 | Ortmann et al. |
| 9,108,505 | B2 | 8/2015 | Supina |
| 9,360,107 | B2 | 6/2016 | Pietron et al. |
| 9,643,481 | B2 | 5/2017 | Goleski et al. |

* cited by examiner

*Primary Examiner* — Erin D Bishop
(74) *Attorney, Agent, or Firm* — David Kelley; Brooks Kushman, P.C.

(57) ABSTRACT

A powertrain includes a first planetary gearset configured to establish a fixedly linear speed relationship among a first rotor, an engine crankshaft, and a second rotor. The powertrain further includes a gearing assembly configured to alternately selectively establish a plurality of proportional speed relationships between the second rotor and an output shaft. The gearing assembly further includes a second planetary gearset having a lockup clutch configured to selectively couple two rotatable elements of the second planetary gearset.

11 Claims, 3 Drawing Sheets

LOCKUP CLUTCH FOR POWERSPLIT HYBRID TRANSMISSION

TECHNICAL FIELD

This disclosure relates to the field of automatic transmissions for motor vehicles. More particularly, the disclosure pertains to an arrangement of gears, clutches, motors, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input driven by an engine crankshaft, often via a launch device such as a torque converter, and an output driving the vehicle wheels, often via a differential assembly which permits the left and right wheel to rotate at slightly different speeds as the vehicle turns. In front wheel drive vehicles with transverse mounted engines, the engine crankshaft axis is typically offset from the axle axis.

Hybrid electric transmissions further reduce fuel consumption by including one or more reversible electric machines and some type of electrical energy storage such as a battery. Hybrid electric transmissions improve fuel efficiency is several ways. Most internal combustion engines are most efficient when operated at relatively high power settings. A hybrid electric transmission permits operating the engine part of the time at a higher power level than needed for propulsion while storing the excess power in the battery. Then, at other times, the engine is shut off and the vehicle is propelled using the stored energy. Although the engine generates the same amount of total energy, it operates at a higher average efficiency. Also, when the brakes are applied, the reversible electrical machine may capture the vehicle kinetic energy and store it in the battery for later use for propulsion. When the vehicle is stationary and therefore does not require propulsion, the engine can be shut off to eliminate the fuel that would otherwise be used to maintain an idle speed. The electric motor provides the ability to propel the vehicle with the engine off and to rapidly restart the engine when necessary.

SUMMARY

In at least one approach, a powertrain is provided. The powertrain may include a first planetary gearset configured to establish a fixedly linear speed relationship among a first rotor, an engine crankshaft, and a second rotor. The powertrain may further include a gearing assembly configured to alternately selectively establish a plurality of proportional speed relationships between the second rotor and an output shaft. The gearing assembly may further include a second planetary gearset having a lockup clutch configured to selectively couple two rotatable elements of the second planetary gearset.

DETAILED DESCRIPTION

Figure 1:
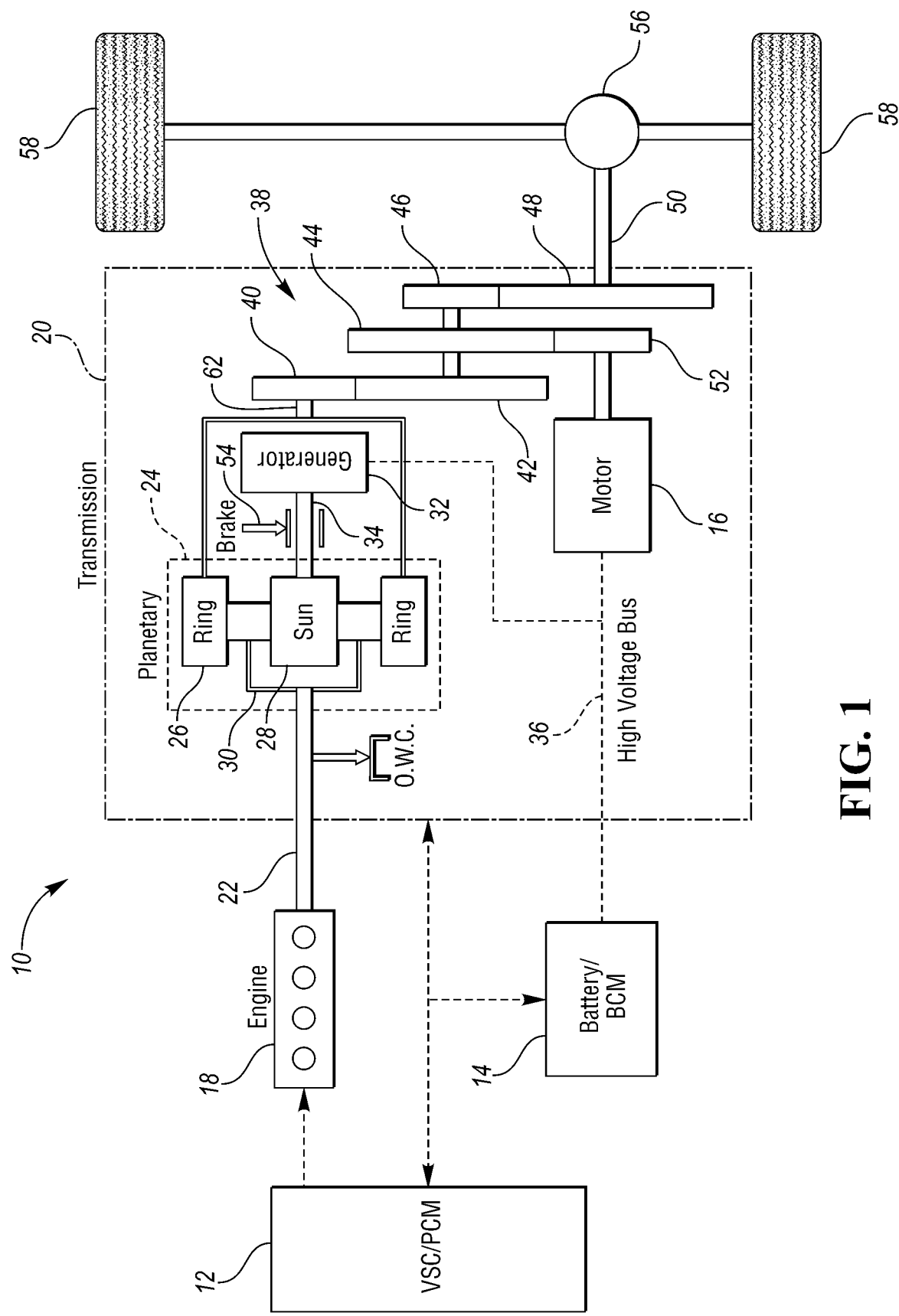
FIG. 1 is a schematic representation of a powersplit powertrain system.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to rotate at the same speed about the same axis in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate at the same speed about the same axis whenever it is fully engaged and they have different rotational speeds about that axis in at least some other operating condition. Two rotatable elements are driveably connected or coupled if there is a fixed proportional speed relationship between them A shift element that holds a rotating element against rotation by selectively coupling it to a fixed housing is called a brake. A shift element that selectively couples two or more rotatable elements to one another is called a clutch. Shift elements may be actively controlled devices such as hydraulically or electrically actuated clutches or brakes or may be passive devices such as one way clutches or brakes. Shift elements may be positive engagement devices such as dog clutches or friction devices capable of transmitting torque between elements in the presence of relative rotation. Two elements are coupled if they are either fixedly coupled or selectively coupled.

A gearing arrangement is a collection of gearing elements and shift elements configured to impose specified speed relationships among a set of shafts. A speed relationship is fixedly imposed by a gearing arrangement if it is imposed regardless of the state of any shift elements. A speed relationship is selectively imposed by a gearing arrangement if the speed relationship is imposed only when particular shift elements of the gearing arrangement are fully engaged. The speed of a shaft is positive when the shaft rotates in one direction and negative when the shaft rotates in the opposite direction. A proportional speed relationship exists between a first shaft and a second shaft when the ratio of their speeds is constrained to be a predetermined value. A proportional speed relationship between a first shaft and a second shaft is an underdrive relationship if the ratio of the second shaft speed to the first shaft speed is between zero and one. Similarly, a proportional speed relationship between a first shaft and a second shaft is an overdrive relationship if the ratio of the second shaft speed to the first shaft speed is greater than one. A linear speed relationship exists among an ordered list of shafts when i) the first and last shaft in the ordered list are constrained to have the most extreme speeds, ii) the speeds of the remaining shafts are each constrained to be a weighted average of the speeds of the first and last shafts with predetermined weightings, and iii) when the speeds of the shafts differ, they are constrained to be in the listed order, either increasing or decreasing.

Referring to FIG. 1, a hybrid electric vehicle (HEV) includes a powersplit powertrain 10. The vehicle may include a vehicle system controller (VSC) and powertrain control module (PCM) 12 for controlling an electric traction battery 14. The battery 14 may have a two-way electrical connection, whereby it receives and stores electric energy and also supplies the energy to an electric traction motor 16. The controller 12 may also control the operation of an internal combustion engine (ICE) 18. Both the motor 16 and the engine 18 are capable of powering a transmission 20 that ultimately delivers torque to the wheels of the vehicle.

The engine 18 delivers power to a torque input shaft, such as crankshaft 22, that is connected to a planetary gear set 24, for example, through a one way clutch. The crankshaft 22 powers the planetary gear set 24 that includes a ring gear 26, a sun gear 28, and a planetary carrier assembly 30. The crankshaft 22 is driveably connected to the carrier assembly 30 to power the planetary gear set 24. The planetary gear set 24 may distribute torque to an intermediary shaft, which may be, for example, a second rotor 62.

The sun gear 28 is driveably connected to a generator 32; for example, through a first rotor 34. The generator 32 may be engaged with the sun gear 28, such that the generator 32 may either rotate with the sun gear 28, or not rotate with it. When the one way clutch couples the engine 18 to the planetary gear set 24, the generator 32 generates energy as a reactionary element to the operation of the planetary gear set 24. Electric energy generated from the generator 32 may be transferred to the battery 14 through electrical connections 36. The battery 14 also receives and stores electric energy through regenerative braking, in known fashion. The battery 14 supplies the stored electric energy to the motor 16 for operation. The portion of the power delivered from the engine 18 to the generator 32 may also be transmitted directly to the motor 16. The battery 14, motor 16, and generator 32 are each interconnected in a two-way electric flow path through electrical connections 36.

The vehicle may be powered by the engine 18 alone, by the battery 14 and motor 16 alone, or by a combination of the engine 18 with the battery 14 and motor 16. In a first mode of operation, the engine 18 is activated to deliver torque through the planetary gear set 24. The ring gear 26 may distribute torque through the second rotor 62 to step ratio gears 38, which may, for example, comprise meshing gear elements 40, 42, 44, and 46. Gears 42, 44, and 46 are mounted on a countershaft, and gear 46 distributes torque to gear 48. Gear 48 then distributes torque to a torque output shaft or countershaft 50. In the first mode of operation, the motor 16 may also be activated to assist in the engine 18. When the motor 16 is active in assisting, gear 52 distributes torque to gear 44 and to the countershaft.

In a second mode of operation, or EV mode, the engine 18 is disabled or otherwise prevented from distributing torque to the torque output shaft 50. In the second mode of operation, the battery 14 powers the motor 16 to distribute torque through the step ratio gears 38 and to the torque output shaft 50.

The torque output shaft 50 is connected to a differential and axle mechanism 56 which distributes torque to traction wheels 58. The controller 12 controls the battery 14, engine 18, motor 16 and generator 32 in order to distribute torque to the wheels 58 in either the first mode of operation or the second mode of operation.

As previously described, there are two power sources for the driveline. The first power source is the engine 18, which delivers torque to the planetary gear set 24. The other power source involves only the electric drive system, which includes the motor 16, the generator 32 and the battery 14, where the battery 14 acts as an energy storage medium for the generator 32 and the motor 16. The generator 32 may be driven by the planetary gear set 24, and may alternatively act as a motor and deliver power to the planetary gear set 24.

The powertrain 10 may further include a generator brake 54. The generator brake 54 may be disposed, for example, adjacent the first rotor 34. The generator brake 54 may be activated to "brake" or prevent rotation of the shaft of the generator 32 and of the sun gear 28. In this way, the generator brake 54 may be activated so that engine output power is transmitted with a fixed gear ratio to the torque output side of the powertrain 10 through a mechanical path only.

Figure 2A:
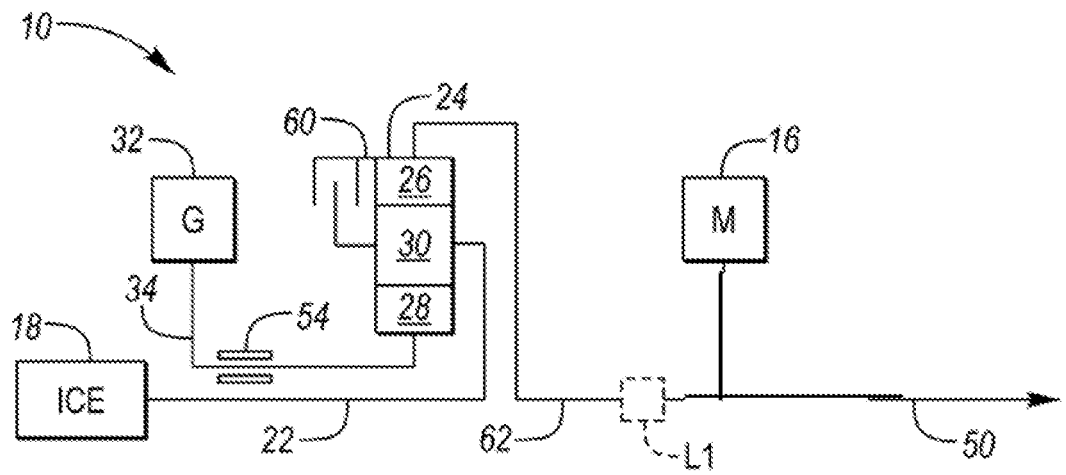
FIGS. 2A, 2B, and 2C each illustrate a schematic representation of a powersplit powertrain system including a lockup clutch.
Figure 3:
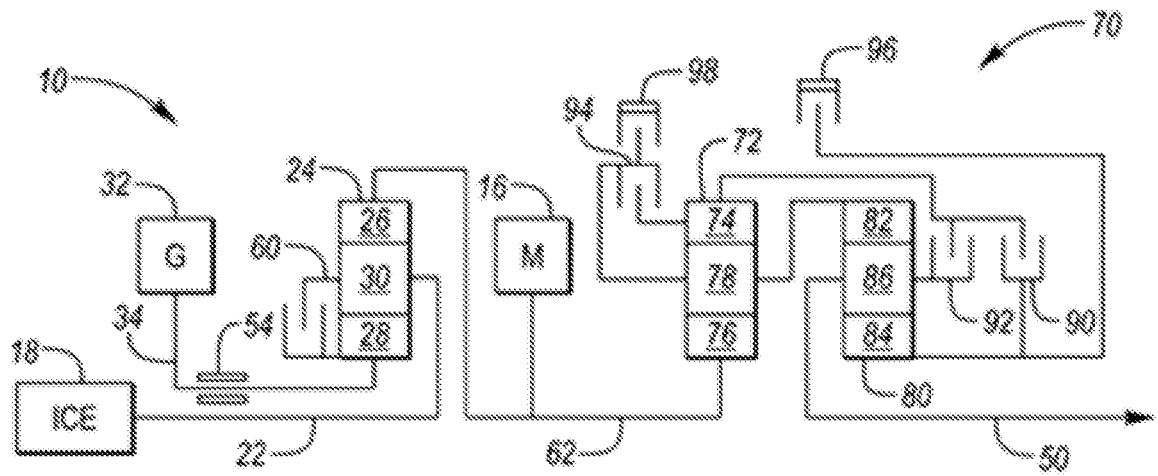
FIG. 3 is a schematic representation of a first transmission gearing arrangement.
Figure 4:
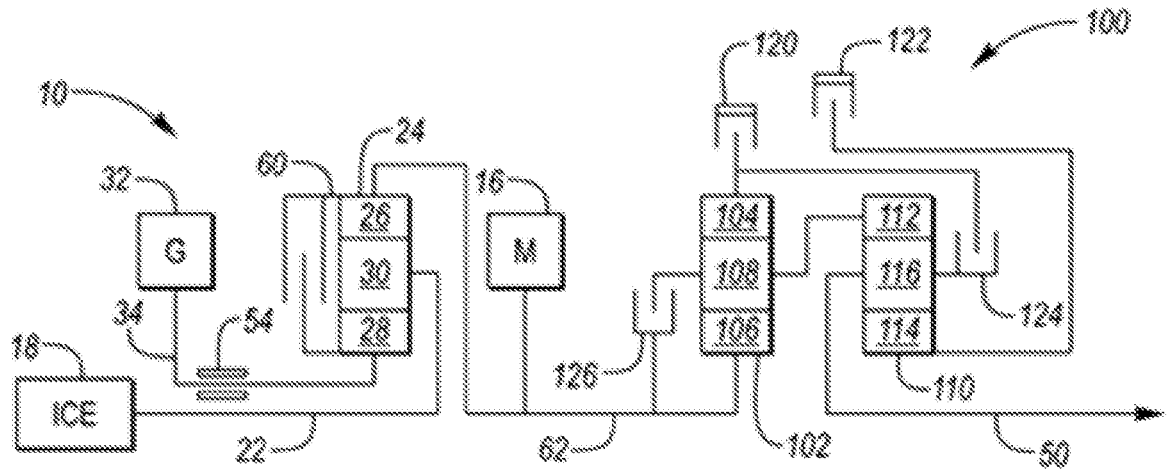
FIG. 4 is a schematic representation of a second transmission gearing arrangement.

Referring now to FIGS. 2-4, the powertrain 10 may further include a lockup clutch 60. The lockup clutch 60 may be adapted to lock up the planetary gear set 24 of the transmission 20. In at least one approach, shown in FIG. 2, the lockup clutch 60 is adapted to lock the ring gear 26 and the planetary carrier assembly 30. In at least one other approach, shown in FIG. 3, the lockup clutch 60 is adapted to lock the sun gear 28 and the planetary carrier assembly 30. In at least one other approach, shown in FIG. 4, the lockup clutch 60 is adapted to lock the ring gear 26 and the sun gear 28.

Lockup of the planetary gear set 24 by the lockup clutch 60 causes the gears of the ring gear 26, sun gear 28, and planetary carrier 30 to mesh and "lock up," thus transmitting torque from the engine 18 to the transmission 20. In this way, the elements of the planetary gear set 24 rotate in unison with a 1 to 1 speed ratio. Lockup of the planetary gear set 24 by the lockup clutch 60 may reduce or eliminate mesh loss in the planetary gear set 24, thereby improving transmission efficiency when in the locked-up configuration.

Figure 2B:
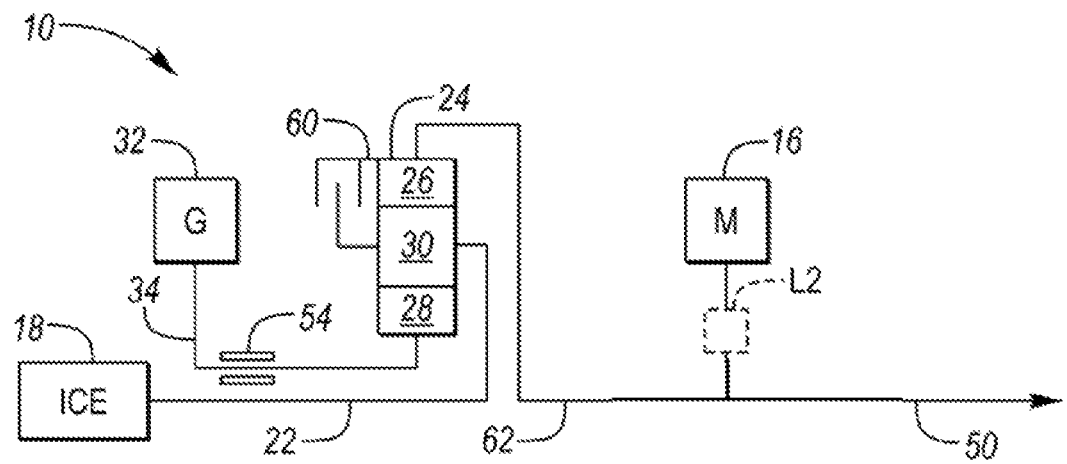
Figure 2C:
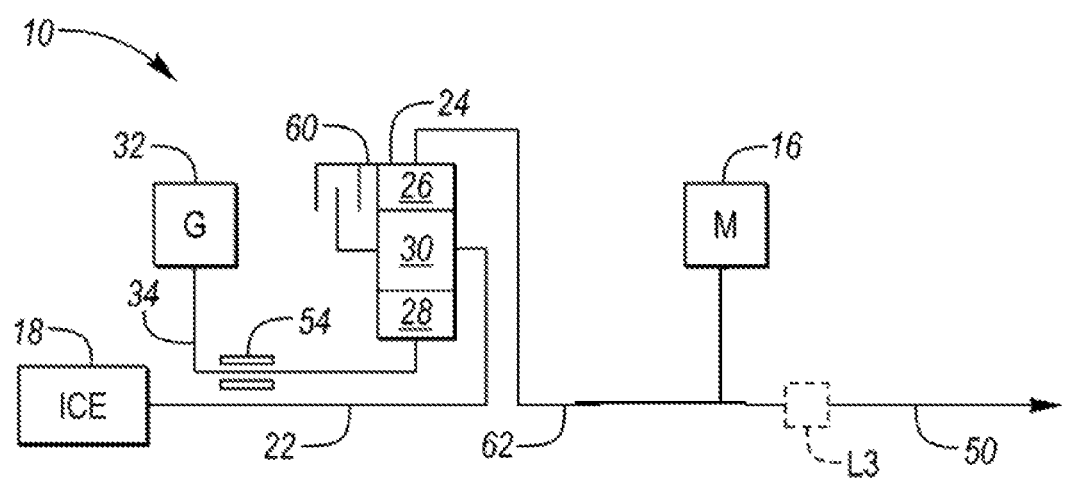

The transmission 20 may include a gearing-arrangement that may be disposed, for example, at location L1, as illustrated by way of example in FIG. 2A, location L2, as illustrated by way of example in FIG. 2B, or location L3 as illustrated by way of example in FIG. 2C Referring now to FIG. 3, a first gearing-arrangement 70 may include a first planetary gear set 72 that includes a ring gear 74, a sun gear 76, and a planetary carrier assembly 78. The first gearing-arrangement 70 may include a second planetary gear set 80 that includes a ring gear 82, a sun gear 84, and a planetary carrier assembly 86.

Sun gear 76 is fixedly coupled to an input 62. The planetary carrier assembly 78 is fixedly coupled to ring gear 82. In at least one approach, the planetary carrier assembly 78 is selectively coupled to ring gear 74 by clutch 94. In at least another approach, the planetary carrier assembly 78 is selectively coupled to sun gear 76 by clutch 94. In either approach, clutch 94 may act as a "lockup clutch" for the first planetary gear set 72.

In at least one approach, brake 98 selectively couples the planetary carrier assembly 78 to a housing to selectively hold it against rotation, or selectively couples both the planetary carrier assembly 78 and the ring gear 74 to a housing to selectively hold them against rotation. In this way, the first gearing-arrangement 70 may provide four forward speeds with a reverse clutch. In at least another approach, the first gearing-arrangement 70 does not include brake 98. In this way, the first gearing-arrangement 70 may provide four forward speeds without a reverse clutch.

Ring gear 74 is selectively coupled to sun gear 84 by clutch 90. Ring gear 74 is also selectively coupled to the planetary carrier assembly 86 by clutch 92. The planetary carrier assembly 86 is fixedly coupled to output 50.

In at least one approach, brake 96 selectively couples sun gear 84 to a housing to selectively hold it against rotation. In at least another approach, the first gearing-arrangement 70 does not include brake 96 or brake 98. In this way, the first gearing-arrangement 70 may provide three forward speeds without a reverse clutch.

Various power flow paths between input shaft 62 and output shaft 50 are established by the selective engagement of the clutches and brakes of the first gearing-arrangement 70. As shown in Table 1, engaging the shift elements in combinations of two or three establishes four forward speed ratios and one reverse speed ratio between input 62 and output 50. An X indicates that the shift element is required to establish the power transfer path.

TABLE 1

|       | Ratio  | 90 | 92 | 94 | 96 | 98 |
|-------|--------|----|----|----|----|----|
| 1st   | 5.442  | X  |    |    |    | X  |
| 2nd   | 2.905  |    | X  |    |    | X  |
| 3rd   | 1.539  |    |    | X  |    | X  |
| 4th   | 1.000  |    | X  | X  |    |    |
| Rev   | -7.248 | X  |    |    |    | X  |
| Alt 1 | -2.537 |    | X  |    |    | X  |
| Alt 2 | 1.000  | X  | X  |    |    |    |
| Alt 3 | 1.000  | X  |    | X  |    |    |

Referring now to FIG. 4, a second gearing-arrangement 100 may include a first planetary gear set 102 that includes a ring gear 104, a sun gear 106, and a planetary carrier assembly 108. The second gearing-arrangement 100 may include a second planetary gear set 110 that includes a ring gear 112, a sun gear 114, and a planetary carrier assembly 116.

Sun gear 106 is fixedly coupled to an input 62. The planetary carrier assembly 78 is fixedly coupled to ring gear 112. Brake 120 selectively couples ring gear 104 to a housing to selectively hold it against rotation.

Ring gear 104 is selectively coupled to the planetary carrier assembly 116 by clutch 124. The planetary carrier assembly 116 is fixedly coupled to output 50. In at least one approach, brake 122 selectively couples sun gear 114 to a housing to selectively hold it against rotation. In at least another approach, the second gearing-arrangement 100 does not include brake 122. In this way, the second gearing-arrangement 100 may provide three forward (e.g., underdrive) speeds without a reverse clutch.

In at least one approach, ring gear 104 is selectively coupled to sun gear 106 by clutch 126. In at least another approach, ring gear 104 is selectively coupled to the planetary carrier assembly 108 by clutch 126. In at least another approach, the planetary carrier assembly 108 is selectively coupled to sun gear 106 by clutch 126. In these approaches, clutch 126 may act as a "lockup clutch" for the first planetary gear set 102.

Various power flow paths between input shaft 62 and output shaft 50 are established by the selective engagement of the clutches and brakes of the second gearing-arrangement 100. As shown in Table 2, engaging the shift elements in combinations of two or three establishes four forward speed ratios and one reverse speed ratio between input 62 and output 50. An X indicates that the shift element is required to establish the power transfer path.

TABLE 2

|     | Ratio | 120 | 122 | 124 | 126 |
|-----|-------|-----|-----|-----|-----|
| 1st | 5.442 | X   |     |     | X   |
| 2nd | 2.905 |     | X   |     | X   |
| 3rd | 1.539 |     |     | X   | X   |
| 4th | 1.000 |     | X   | X   |     |

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A powertrain comprising:
   a first planetary gearset configured to establish, a fixedly linear speed relationship among a first rotor, an engine crankshaft, and, a second rotor; and
   a gearing assembly configured to alternately selectively establish a plurality of proportional speed relationships between the second rotor and an output shaft, and including
   (i) a second planetary gearset having a first rotatable element, a second rotatable element fixedly coupled to the second rotor, and a third rotatable element, the second planetary gear set having a lockup clutch configured to selectively couple two rotatable elements of the first, second, and third rotatable elements, wherein the first rotatable element is a first planetary carrier assembly, wherein the second rotatable element is a first sun gear, and wherein the third rotatable element is a first ring gear, and
(ii) a third planetary gearset having a fourth rotatable element fixedly coupled to the output Shaft, a fifth rotatable element, and a sixth rotatable element, wherein the fourth rotatable element is a secondary planetary carrier assembly, wherein the fifth rotatable element is a second sun gear, wherein the sixth rotatable element is a second ring gear, and wherein the first planetary carrier assembly is fixedly coupled to the second ring gear.

2. The powertrain of claim 1 wherein the first ring gear is selectively coupled to the second planetary carrier assembly.

3. The powertrain of claim 2 further comprising a first brake configured to selectively hold the second sun gear against rotation.

4. The powertrain of claim 3 wherein the first ring gear is selectively coupled to the second sun gear.

5. The powertrain of claim 3 further comprising a second brake configured to selectively hold the first planetary carrier assembly against rotation.

6. The powertrain of claim 3 further comprising a second brake configured to selectively hold the first ring gear against rotation.

7. The powertrain of claim 1 wherein the first planetary gearset includes a first rotatable element fixedly coupled to the engine crankshaft, a second rotatable element fixedly coupled to the first rotor, and a third rotatable element driveably connected to the second rotor.

8. The powertrain of claim 7 further comprising a lockup clutch configured to selectively couple two of the first rotatable element fixedly coupled to the engine crankshaft, the second rotatable element fixedly coupled to the first rotor, and the third rotatable element driveably connected to the second rotor.

9. The powertrain of claim 8 further comprising a generator brake configured to selectively hold the first rotor against rotation.

10. The powertrain of claim 2 wherein the plurality of proportional speed relationships includes at least four positive speed relationships.

11. A powertrain comprising:
an engine;
a first electric machine;
a second electric machine;
a first planetary gearset including a first rotatable element fixedly coupled to an engine crankshaft, a second rotatable element fixedly coupled to the first electric machine, and a third rotatable element driveably connected to an intermediate shaft; and
a gearing assembly configured to alternately selectively establish a plurality of proportional speed relationships between the intermediate shaft and an output shaft, and including,
(i) a second planetary gearset having a lockup clutch configured to selectively couple a first planetary carrier assembly and a first ring, and
(ii) a second ring gear, wherein the first planetary gearset is fixedly coupled to the second ring gear.

* * * * *